Nov. 27, 1951     J. TANNENBERG     2,576,153
TISSUE EMBEDDING APPARATUS
Filed Aug. 21, 1948
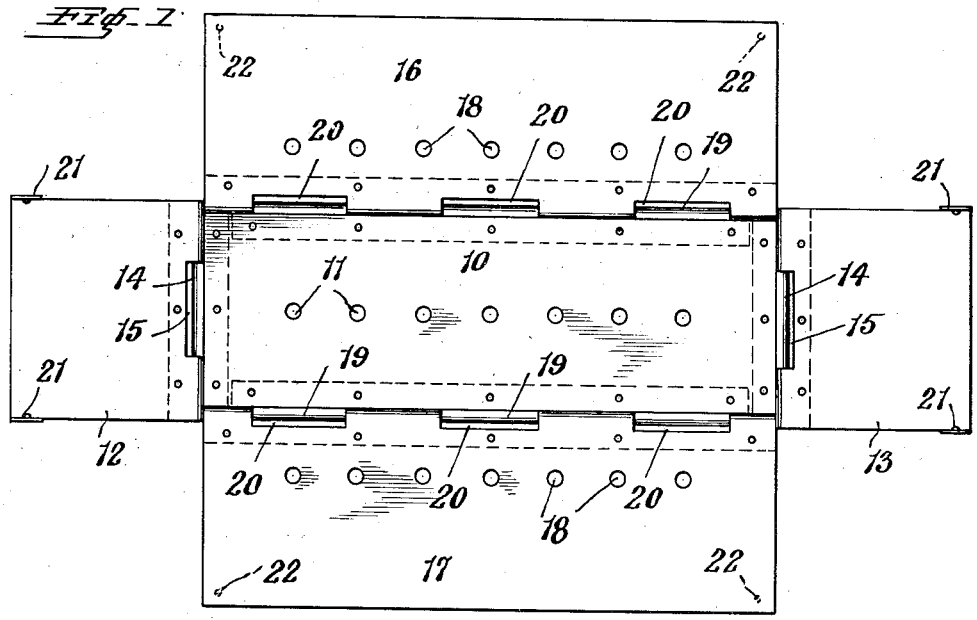
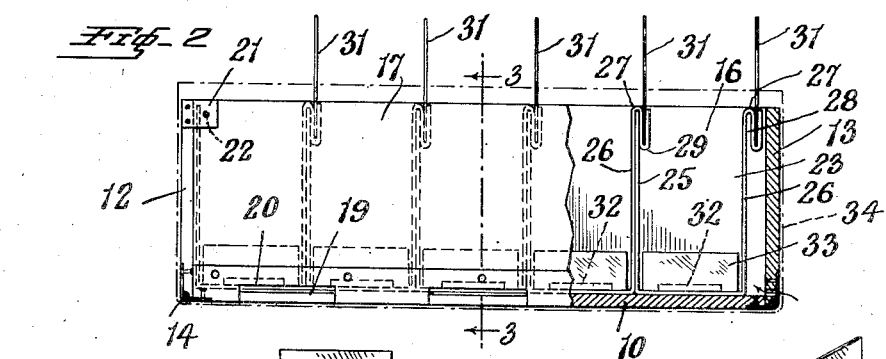
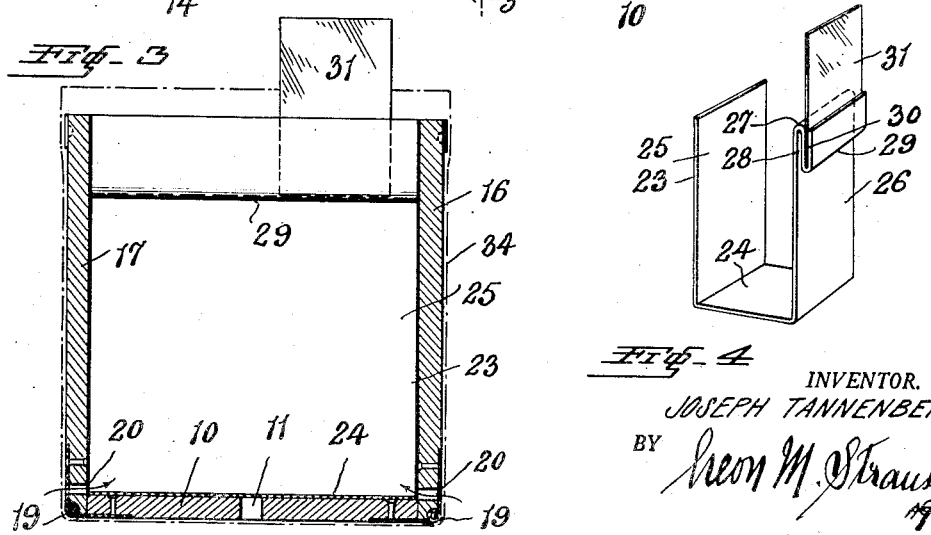
INVENTOR.
JOSEPH TANNENBERG
BY Patented Nov. 27, 1951

2,576,153

UNITED STATES PATENT OFFICE 2,576,153

TISSUE EMBEDDING APPARATUS

Joseph Tannenberg, Batavia, N. Y.

Application August 21, 1948, Serial No. 45,519

6 Claims. (Cl. 18—39)

This invention relates to an apparatus for embedding tissue specimens or similar biological material in blocks of paraffin or other appropriate mass and for preparing such blocks for biological and similar purposes. The expression "tissue blocks" employed in the following specification and claims is to be understood to designate paraffin blocks or blocks of similar mass having embedded therein tissue specimens of organic bodies.

A device of the general character to which the present invention has reference is shown in my Patent No. 2,437,713, dated March 16, 1948, and one of the objects of the present invention is to provide a simplified and improved structure greatly facilitating the operation and use of the described device.

Another object of the present invention is to provide a structure having all of the advantages of the structure shown and described in the above-mentioned patent; to simplify the method of using the structure and to couple the various parts thereof together in a manner to result in a more unitary structure.

More particularly, the invention contemplates the provision of a perforated outer container or casing composed of a bottom and hingedly attached side walls, the walls being capable of pivotal movement to cooperative vertical positions in which they are maintained by coupling means provided on them; of a plurality of separators or tissue carriers for fitment within the container or casing and in which the tissue blocks are formed, which separators or tissue carriers are arranged for interengagement when in place in the container, yet may be readily removed therefrom and separated from one another, said tissue carriers having means for bearing suitable identifying tags or markers.

These and other objects are attained by the invention, a more particular description of which will hereinafter appear and be set forth in the claims appended hereto.

In the accompanying drawing, wherein an illustrative embodiment of the invention is shown:

Fig. 1 is a top plan view of the casing or container in its open or flat position;

Fig. 2 is a side elevation, with parts broken away and other parts shown in section of the container, showing the same in its erected position, with the separators or tissue carriers in place;

Fig. 3 is a sectional view taken on the line 3—3 of Fig. 2, looking in the direction of the arrows, and Fig. 4 is a perspective view of one of the separators or tissue carriers.

The container or casing includes a bottom member or plate 10 of substantially rectangular form and preferably composed of suitable non-corrosive mass, said bottom being preferably formed with the central line of perforations 11. The end walls of the container are shown respectively at 12 and 13, and each of these walls is pivotally attached to the ends of the bottom member 10 by so-called "piano" hinges 14, the arrangement and structure of said hinges being such as to provide apertures 15 adjacent to them, substantially as shown in Fig. 1. The side walls of the container or casing are respectively indicated at 16 and 17, and each of these walls is provided with the line of apertures 18. Each of the side walls 16 and 17 is pivotally attached to the side edges of the bottom 10 by means of the lengthy piano hinges 19 resulting in the production of the apertures 20. The arrangement above described is such that when the container is in a position of non-use, as shown in Fig. 1, the side walls and ends of the container are horizontally disposed in the same plane as the bottom. To erect or set up the container, it is merely necessary to pivotally move the walls to upright position, in which position they are maintained by interengagement of the clips 21 on the side edges of the end walls 13 and 14 near the upper ends of the same, with depressions 22 provided on the outer faces of the side walls 16 and 17. The overlap of the end walls 12 and 13 with the ends of the side walls 16 and 17, when the walls are in the erect position, results in the formation of a box or container of sturdiness and rigidity.

The tissue holders or separators which fit within the container, and each of which receives a tissue specimen for embedment in a block of paraffin, are indicated at 23. One of said tissue holders or separators is shown in detail in Fig. 4, wherein it will be noted that the same is substantially U-shaped, thus having a bottom or base portion 24 on which the tissue specimen is rested, and from which arises a pair of spaced, substantially parallel and integrally formed upstanding walls indicated respectively at 25 and 26. The wall 26 is of greater length than the wall 25 and is doubled downwardly or folded upon itself as indicated at 27 to provide a downwardly directed recess or space 28 for the reception of the upper end of the wall 25 of an adjacent tissue holder or separator 23 as clearly shown in Fig. 2. The downturned portion of the wall 26 is provided with an upwardly folded extension as indicated at 29, this resulting in the production of a second and upwardly directed recess 30 into which may be inserted or to which may be affixed a tag 31, slip of paper or other marker bearing identifying writing to designate the respective tissue carried by that carrier.

From the foregoing, the manner in which the improved apparatus is used will be readily understood. After the container is erected in the manner described, the separators or tissue carriers, each bearing a tissue specimen 32, are placed in position in the container and the container and its contents is subjected to dehydration to prepare the tissue specimens and facilitate the penetration thereof by paraffin to be subsequently brought in contact with the same. The apertures 15, 18, 20 and 11 facilitate the access to the tissue by the dehydration fluids. The embedding container is next placed upon a sheet of metal foil, such as lead or aluminum foil, which is folded upwardly and brought around the sides of the container, as diagrammatically indicated at 34, thus rendering the container substantially leakproof because of its enclosure by the foil. The envelopment of the container by the metal foil 34 also serves to close the aforesaid apertures and permits retention of the molten paraffin which is then poured into the container to fill the several compartments to the required height to form the blocks 33. When solidification of the paraffin begins, the container, with the metallic foil still in place, is placed in cold water or under refrigeration until the paraffin solidifies. Next the metallic foil envelope is removed and the end walls 12 and 13 are lowered. Next one of the side walls 16 or 17 is lowered, and block after block is then removed, each carrying its tissue specimen.

The tissue carriers or separators 23 are preferably composed of thin, flexible metal and therefore the walls 25 and 26 thereof are capable of being bent or flexed to spread or separate them and when this is done, the block of paraffin and its embedded tissue specimen is easily removed. After use, the container and the separators or tissue carriers are easily cleaned of any adherent paraffin by simply boiling these parts in water for a few moments.

Having described one practical embodiment of the invention, it is obvious that the same is not to be restricted thereto, but is broad enough to cover all structures coming within the scope of the claims appended hereto.

It is to be mentioned that the form of the embedding box, instead of being rectangular as shown, may also be round, the base of said box having an almost ring-like shape. Its outer borderline or ring, however, is not circular but forms a hexagon, octagon or has ten, twelve and more evenly spaced corners, while the inner rim of the ring-like base forms a circle or the same geometrical figure as the outer rim, the spaces between two corners being only smaller. In such a case hinged and perforated sidewalls would be attached to the outer rim of the ring-like base, their number being dependent on whether the structure has 6, 10, 12 or more corners, so as to provide a hinged sidewall of adequate size between each two corners. The sidewalls arising from the inner rim of the base need not be hinged but may be permanently connected with the base and project vertically or in such a way as to form a cone-like structure.

The sidewalls may advantageously have perforations in their upper portions. The tissue carriers in this case have the essential features described above in detail, only their base will not be of rectangular, but rather of quadrangular shape with sidewalls thereof not parallel to each other; the base of these carriers corresponds substantially to the same geometrical configuration as that of the base of the embedding box.

Having thus described the invention, what I claim as new and desired to be secured by Letters Patent, is:

1. An apparatus for simultaneously embedding a plurality of tissue samples in paraffin blocks comprising, a container having a single bottom, walls hingedly attached to the edges of said bottom and adapted to be swung into the plane and contiguous to and to be erected in vertical position about the bottom, interengaging means on the walls of said container for releasably retaining the walls in said vertical position, a plurality of tissue holders for fitment within said container, each tissue holder comprising a U-shaped element having spaced vertical walls, and interlocking means on one wall of each tissue holder for engagement with a vertical wall of an adjacent tissue holder.

2. In an apparatus for simultaneously embedding a plurality of tissue samples in paraffin blocks, a tissue holder comprising a U-shaped member having a base portion for the support of a tissue sample, a pair of upstanding walls arising substantially parallel and in spaced relation to each other from the base, at least one of said walls being folded at the top and forming a downwardly directed recess engageable with the top edge of an upstanding wall of an adjacent tissue holder, whereby said tissue holders are coupled to each other.

3. In an apparatus for simultaneously embedding a plurality of tissue samples in paraffin blocks, a tissue holder comprising a U-shaped member having a base portion for the support of a tissue sample, a pair of spaced upstanding walls arising from said base portion, one of said walls being provided with a folded portion at the top to form a recess engageable with the top edge of an upstanding wall of an adjacent tissue holder to thereby couple two tissue holders together, said folded portion including a fold extension to provide a second recess for receiving an identifying marker.

4. An apparatus for simultaneously embedding a plurality of tissue samples in paraffin blocks comprising, a container having a bottom surrounded by hinged walls adapted for erection to vertical position with respect to said bottom, at least some of said walls and said bottom being apertured, a plurality of U-shaped tissue holders placed in said container and forming transverse partitions across the latter, each tissue holder having spaced upstanding walls, interengaging means on said container walls to thereby connect the same together and to surround said tissue holders, and means on one wall of each tissue holder for receiving and holding an identifying marker.

5. An apparatus for simultaneously embedding a plurality of tissue samples in paraffin blocks comprising, a container having a bottom and side walls, hinge means connecting said side walls for erection to vertical position to thereby surround the bottom, said walls being provided with apertures, said apertures extending adjacent said hinge means through said walls, means on said container walls for coupling the same together to releasably hold said walls in said vertical position and cause them to form an enclosure about the bottom, a plurality of substantially U-shaped tissue holders for placement in the container and forming transverse partitions within said container, each tissue holder having a pair of spaced upstanding walls, interengaging means on one of each pair of said upstanding walls to thereby connect the tissue holders together and independently of said container walls, means on at least one wall of each tissue holder for receiving and holding an identifying marker, and a sheet of flexible metallic foil folded around the bottom and side walls of the container to render the container substantially leak-proof.

6. An apparatus for embedding tissues comprising a casing having a bottom wall, two opposite side walls, and two opposite end walls; hinge means swingably connecting said side walls with said bottom wall, respectively, and further hinge means connecting said end walls to said bottom wall, all said hinge means being provided with openings permitting escape of fluid from within said casing therewithout when in erected and closed condition, said hinge means permitting said side walls and said end walls to be swung into the plane of said bottom wall in open condition, the width of said end walls corresponding to the width of said bottom wall and the thicknesses of said side walls, interengaging means on said end walls and on said side walls, respectively, for maintaining said side walls and said end walls in said erected condition with respect to said bottom wall, and carrier means for position on said bottom wall and extending between said side walls, each of said carrier means comprising a base for supporting a tissue sample, and two legs spacedly and upwardly extending from said base, one of said legs being folded upon itself at its upper end to thereby provide a U-shaped connecting piece adapted for the reception of the upper end of the leg of an adjacent carrier means whereby said carrier means are coupled with each other within the confines of said casing.

JOSEPH TANNENBERG.

REFERENCES CITED

The following references are of record in the file of this patent:

UNITED STATES PATENTS

| Number | Name | Date |
|---|---|---|
| 953,249 | Widmer-Ackermann | Mar. 29, 1910 |
| 2,437,713 | Tannenberg | Mar. 16, 1948 |